US007570379B2

(12) United States Patent
Wiechers et al.

(10) Patent No.: US 7,570,379 B2
(45) Date of Patent: Aug. 4, 2009

(54) DOCUMENT PROFILE FOR GENERATION OF PRODUCTION READY DOCUMENTS IN A COMMERCIAL PRINTING ENVIRONMENT

(75) Inventors: Alejandro Wiechers, Boise, ID (US); Rodolfo Jodra, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1092 days.

(21) Appl. No.: 10/635,536

(22) Filed: Aug. 7, 2003

(65) Prior Publication Data

US 2005/0030570 A1 Feb. 10, 2005

(51) Int. Cl.
*G06F 15/00* (2006.01)
*G06F 15/16* (2006.01)

(52) U.S. Cl. ..................... 358/1.15; 709/206

(58) Field of Classification Search ............. 358/1.15, 358/1.13, 1.18, 1.16; 709/206, 203, 217, 709/213, 231; 700/113; 707/6, 9; 380/2
See application file for complete search history.

(56) References Cited

U.S. PATENT DOCUMENTS

| 4,839,892 | A | * | 6/1989 | Sasaki ..................... 370/348 |
| 5,963,641 | A | * | 10/1999 | Crandall et al. ............. 380/2 |
| 5,995,723 | A |   | 11/1999 | Sperry et al. ............. 395/114 |
| 6,247,011 | B1 |  | 6/2001 | Jecha et al. ................. 707/9 |
| 6,407,820 | B1 |  | 6/2002 | Hansen et al. ........... 358/1.12 |

(Continued)

FOREIGN PATENT DOCUMENTS

EP 1197838 4/2002

(Continued)

OTHER PUBLICATIONS

Article—Leadtools—"Leading Technology in Imaging Developer Toolkits".

(Continued)

*Primary Examiner*—Saeid Ebrahimi Dehkordy

(57) ABSTRACT

A method, program product and system for generating a production ready document in a commercial printing environment including a designer location and a print service provider location, where the method comprises creating a file at the designer location using updated device configuration information from the print service provider location, selecting a document profile for the file from a plurality of document profiles available at the print service provider location, applying the selected document profile to the file and adjusting characteristics of the file, if necessary, to ensure that the file is a production ready document, submitting the production ready document to the print service provider location via an electronic network, and performing at least one of automated printing, finishing, packaging and shipping using the production ready document.

Also, a method, program product and system for generating a production ready document in a commercial printing environment including a designer location and a print service provider location, where the method comprises selecting a document profile corresponding to a particular type of production project from a plurality of document profiles available at the print service provider location, creating a file at the designer location using the selected document profile and updated device configuration information from the print service provider location to ensure that the file is a production ready document, submitting the production ready document to the print service provider location via an electronic network, and performing at least one of automated printing, finishing, packaging and shipping using the production ready document.

26 Claims, 3 Drawing Sheets

U.S. PATENT DOCUMENTS

| | | | |
|---|---|---|---|
| 6,411,314 B1 | 6/2002 | Hansen et al. | 345/769 |
| 6,429,947 B1 | 8/2002 | Laverty et al. | 358/1.15 |
| 6,441,920 B1 | 8/2002 | Smith | 358/1.2 |
| 6,462,756 B1 | 10/2002 | Hansen et al. | 345/764 |
| 6,480,291 B1 | 11/2002 | Daniels et al. | 358/1.11 |
| 6,509,974 B1 | 1/2003 | Hansen | 358/1.12 |
| 6,608,697 B1 * | 8/2003 | Schorr et al. | 358/1.15 |
| 2002/0071134 A1 | 6/2002 | Jackson et al. | 358/1.13 |
| 2002/0101608 A1 | 8/2002 | Whitmarsh | 358/1.15 |
| 2005/0264832 A1 * | 12/2005 | Baum et al. | 358/1.2 |

FOREIGN PATENT DOCUMENTS

| | | |
|---|---|---|
| JP | 02165319 | 6/1990 |
| JP | 07064744 | 3/1995 |
| JP | 8065490 | 3/1996 |
| JP | 2000071576 | 3/2000 |

OTHER PUBLICATIONS

Article—Extensis—"Preflight Pro—Features".
Article—Extensis—"PrintReady—Features".
Article—Extensis—"Collect Pro—What's New".

* cited by examiner

DTP JOB TICKET

Contents:
- Total number of elements
- Job name
- List of files with names, fonts, images, text, etc
- PSP Job ticket
- Designer's information
- Customer information
- Target Print Shop
- Target Digital Press
- Target process: DTP
- STATUS
- preflight DONE
- remote proofing file xxx.rpf INCLUDED
- imposition DONE
- imposition instructions: NOT INCLUDED
- finishing instructions DONE and INCLUDED
- finishing mockup drawing DONE AND INCLUDED
- packaging instructions DONE AND INCLUDED
- shipping instructions DONE AND INCLUDED

DOCUMENT PROFILE FOR GENERATION OF PRODUCTION READY DOCUMENTS IN A COMMERCIAL PRINTING ENVIRONMENT

BACKGROUND OF THE INVENTION

In commercial printing there exists a typical workflow. The customer creates a document and submits it to a professional designer. The designer further develops the document into a more professional product suitable for commercial printing. Such products include business cards, flyers, brochures, booklets, etc. The designer then takes this file in electronic format to a print service provider (PSP). An agent at the PSP receives the electronic print job from the designer and begins to prepare a job ticket. Such a job ticket includes the detailed instructions to accompany the print job through the various stages of the printing process. The job ticket also is used to generate a cost estimate for the designer.

The PSP then must perform a number of prepress steps before the print job can be submitted for printing on the commercial printer. Performing these prepress steps takes much time and effort and thus costs the PSP money. Much of the prepress effort is necessitated by a lack of integration between the design and the printing processes. Often, the designer when creating the print job, does not know what printer will be used at the PSP location and does not have the corresponding profile of such printer. In addition, the designer may not know the finishing, packaging, shipping capabilities available at the PSP. This forces the PSP to perform prepress steps after it receives the print job from the designer in order for the print job to be printed, finished, packed and shipped using specific equipment.

Furthermore, the print job received from the designer can and often does contain errors. Such errors include missing fonts, missing images, incorrect image resolutions, missing crop marks, incorrect scaling, incorrect rotation, and incorrect color space. Such errors need to be corrected at the PSP before the print job can be submitted for printing. Another drawback of the lack of integration between the designer and the PSP is poor communication between the parties. This results in a relatively slow proofing and approval cycle between the designer and PSP.

After a job arrives at a PSP a customer service representative generates an estimation of costs and creates a job ticket. This ticket is then attached to the job, either electronically or physically, and remains with the job as it travels through the printing and production process. Often there is no tracking of the job. The job ticket itself contains top level information regarding the job for each stage of the printing process. This allows the various people completing the tasks to see the relevant information regarding the job such as the due date, the type of finishing, what the job is, the number of copies, the colors, etc. As the project goes through the process at the PSP, the people completing the tasks write on the job ticket or indicate on the electronic job ticket to show completion of various tasks. Should someone make a mistake in this process of updating the job ticket or forget to indicate that a task was performed, it creates errors in the total costs charged to the customer and often, such errors result in a loss for the PSP.

"Prepress" is a term used in commercial printing to describe various steps which must be taken before a print job can be submitted to a press. These steps need to be performed to ensure that the print job will actually be printable; that is, will result in a successful and accurate output. The electronic print job is submitted to a preflight program that automatically checks for potential errors such as those errors discussed above. Some of these errors may be critical and have to be fixed manually. For example, the PSP must call the designer in order to obtain a missing font or to get a missing image. This process takes both time and effort and thus cost the PSP money. More than 80% of the files submitted to the PSP have problems that require rework, often requiring contacting the designer. In view of the typically low profit margin in such a print shop, such effort expended at the prepress stage must be minimized.

Another prepress step is "imposition." This is a term used in commercial printing to represent the efficient arrangement and spacing of a print job in order to use materials more efficiently. Yet another prepress step is color management. This involves adjusting colors selected by the designer for use with a particular press. For example, grass that may appear green to the designer on the designer monitor may need to be adjusted for the final output to have the same shade of green.

Often, performing the prepress steps for a print job can take hours or even days, especially when the customer or designer must be contacted. After the prepress steps have been completed, a hard copy proof is prepared and sent to the customer or designer for approval or modification before it is printed.

In addition to prepress steps which must be taken by the PSP, there are certain postpress or back end steps which must be preformed and which are labor intensive under the current workflows. One of these back end steps is "finishing." Finishing is a term used in commercial printing to refer to the treatment of the printed pages such as folding, trimming, cutting or laminating. Creating a booklet out of printed pages is an example of finishing. Under the current workflows, a mock-up of the finished product which is prepared before the main print job was printed is submitted to the person performing the finishing of the final product. This allows this person to finish the product in the manner desired by the designer.

Another back-end task is called "packaging." Packaging refers to the organization and preparation of the finished output in a cost-effective manner so that it may be shipped to the appropriate parties. For some print jobs, sets of the printed output are sent to different parties and must be packaged separately. In the printing of multiple business cards for multiple people for example, the printed cards are organized on sheets such that when they are cut, they do not need to be collated; rather, they are already separated and can be packaged with a minimum amount of effort.

Another back-end task is "shipping." This involves knowledge and decisions on the package size, the type of delivery, costs, etc. The shipping process often involves much labor and paperwork, especially if the print job involves sending the same or similar items to multiple locations. Another back-end task is called job closing. This can include archiving files so that if the designer at a future date needs more of a certain print job all of the effort spent in the prepress and back end stages in configuring the print job will not have been wasted. Often a print job is over-printed in anticipation that the customer designer will want more. Another aspect of job closing is using the job ticket, which presumably has been correctly updated through each of the printing departments, to arrive at a final cost for a job. As mentioned above, since the print job is not being electronically tracked and since the updating of the job ticket is often done manually many details are often lost and the final cost of the job is under-calculated.

In existing systems, when dealing with complex print production, the designer must collaborate closely with the PSP in order to define the printed document. Typically, the designer will explain to the PSP what kind of document he wants. The PSP will describe to the designer the capabilities of a particular printing device, such as maximum paper size. The designer may then create a document for that printing device and may, for example, impose several pages onto a single sheet of printed paper. One of the main limitations of the existing process is that the designer must understand the specific requirements of the production process at the PSP, which makes errors more likely. Also, it requires the designer to create the document with the capabilities of a particular printing device in mind and makes it difficult to recreate it for a different production center.

SUMMARY OF THE INVENTION

The present invention addresses the problems identified by the inventors and provides for the generation of production ready documents in commercial printing using document profiles and an integrated workflow.

Specifically, the present invention provides a method, program product and system for generating a production ready document in a commercial printing environment including a designer location and a print service provider location, where the method comprises creating a file at the designer location using updated device configuration information from the print service provider location, selecting a document profile for the file from a plurality of document profiles available at the print service provider location, applying the selected document profile to the file and adjusting characteristics of the file, if necessary, to ensure that the file is a production ready document, submitting the production ready document to the print service provider location via an electronic network, and performing at least one of automated printing, finishing, packaging and shipping using the production ready document.

The invention also provides a method, program product and system for generating a production ready document in a commercial printing environment including a designer location and a print service provider location, where the method comprises selecting a document profile corresponding to a particular type of production project from a plurality of document profiles available at the print service provider location, creating a file at the designer location using the selected document profile and updated device configuration information from the print service provider location to ensure that the file is a production ready document, submitting the production ready document to the print service provider location via an electronic network, and performing at least one of automated printing, finishing, packaging and shipping using the production ready document.

Other features and advantages of the present invention will become apparent to those skilled in the art from the following detailed description. It should be understood, however, that the detailed description and specific examples, while indicating preferred embodiments of the present invention are given by way of illustration and not limitation. Many changes and modifications within the scope of the present invention may be made without departing from the spirit thereof, and the invention includes all such modifications.

BRIEF DESCRIPTION OF THE DRAWINGS

The foregoing advantages and features of the invention will become apparent upon reference to the following detailed description and the accompanying drawing, where:

FIG. 2 illustrates a job ticket for use with the present invention; and

DETAILED DESCRIPTION OF THE INVENTION

Figure 1:
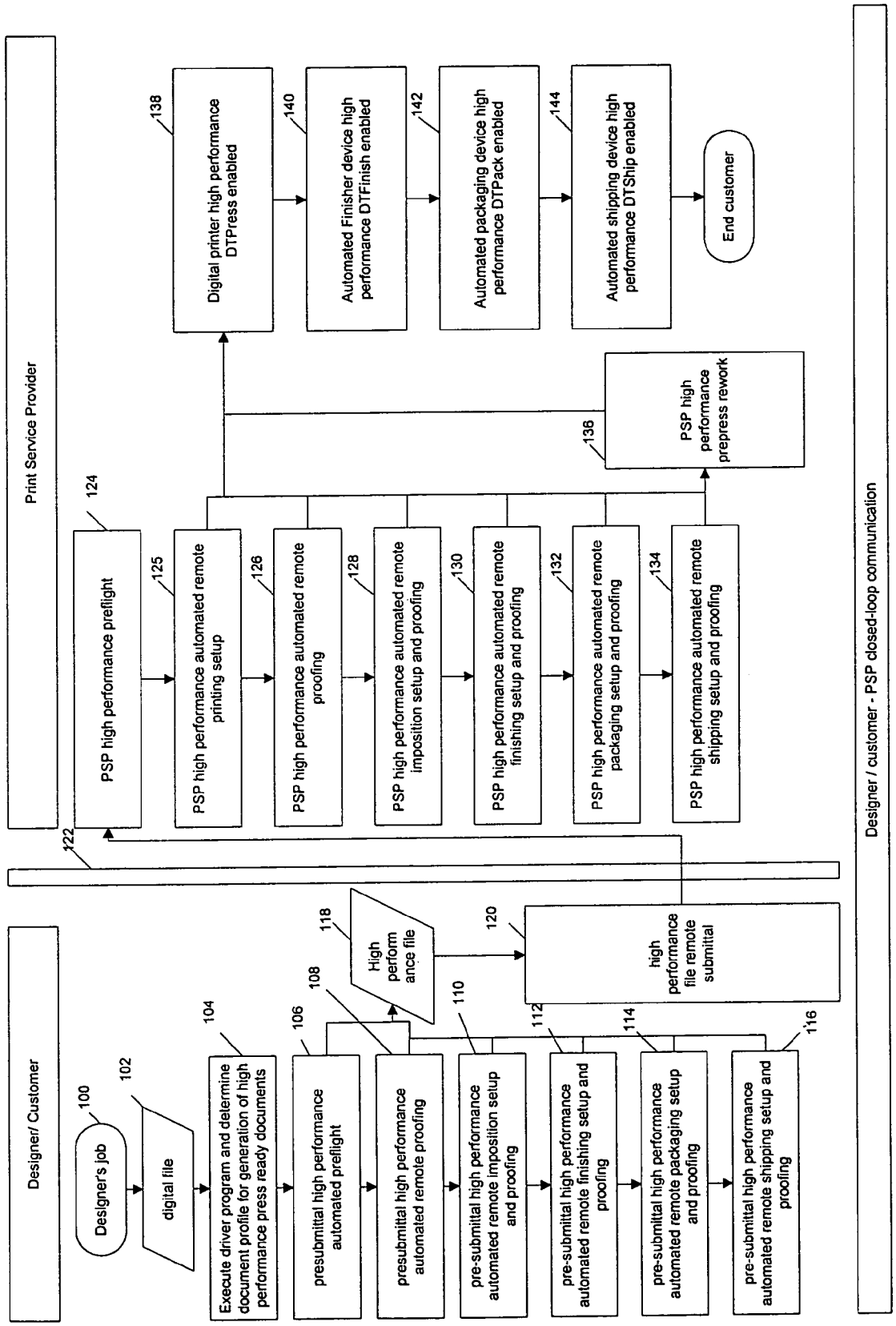
FIG. 1 illustrates an overview of the present invention and shows various modules both at the designer location and at the print service provider location in accordance with a preferred embodiment of the present invention.

The invention is described below with reference to the drawing. The drawing illustrates certain details of a specific embodiment that implements the method of the present invention. However, describing the invention with drawing should not be construed as imposing, on the invention, any limitations that may be present in the drawing. The present invention contemplates methods and program products on any computer readable media for accomplishing its operations. The embodiments of the present invention may be implemented using an existing computer processor, or by a special purpose computer processor incorporated for this or another purpose or by a hardwired system.

FIG. 1 illustrates an overview of the present invention and shows various modules both at the designer location and at the PSP location. Element 100 represents the designer's print job in which he creates a digital file based on his customer's desires. Element 102 represents the digital file itself which may have been created under any commercially available publishing software.

Designer Location

Element 104 is the step of running a driver program at the designer computer and determining the document profile for generation of a high performance press ready document based on the digital file 102. This step 104 also includes the creation of a job ticket to accompany the print job through the printing process. This job ticket is initially pre-populated with certain default values and selections. Some of the information in the job ticket is updated and revised and supplemented through a pre-submittal process at the designer location. One piece of information included in the job ticket is the type of document the print job is. For example, the job ticket could indicate that the print job is a sixteen-page brochure. Another category of information contained in the job ticket is the type of paper the designer wishes to use. Other categories of information in the job ticket include the number of copies to be made, the size of the document in pages, an explanation of the document in detail, any special finishing instructions such as lamination, UV coating, types of binding, etc., any special packaging instructions, any shipping instructions and any billing instructions such as account information or billing dates. The job ticket created at this stage is often updated at various stages in the printing and production process as described herein in accordance with the present invention. An example of a job ticket for use in the present invention is shown in FIG. 2. Sometimes, as is shown in FIG. 2, the job ticket 210 created at the designer location is a broader file called a DTP job ticket and which can contain another job ticket for use by the PSP. This, so-called PSP job ticket is used by certain print service providers but is tied to the broader DTP job ticket.

The designer in step 104 is able to use a browser to see what printers and PSPs are available to print and produce the type of job the designer has created. Not all PSPs can produce all types of commercial printing projects.

The designer also has access to document profiles that correspond to different types of products such as brochures, books, folded pages, etc. In the preferred embodiment of the invention, the designer has already created a file and then selects a corresponding document profile in order to ensure that the created file will properly print at the selected PSP location. The document profile contains information about the target printing device such as its color profile, in addition to information regarding the type of print job such as the number of pages and the restrictions on the sizes of the pages.

In an alternate embodiment, the designer selects a document profile prior to creating the print job itself. In this case, the profile is essentially a blank template for the type of print job he wishes to create. In such an embodiment the designer would use the profile to ensure that the content created will fit within the final printing production process.

Specifically, it is envisioned that the designer and PSP will agree upon the type of document that has to be produced. This involves describing how many pages the document will contain, how they are to be arranged, etc. The PSP will prepare an electronic document profile for use with a particular production device at the PSP. The content of the profile is dependent on the production device and the relevant production processes involved. Different PSPs may impose different restrictions on the same type of document and result in slightly different profiles. Some PSPs, for example, may require a wider margin on one side of the page than other PSPs. The designer can select and retrieve such a profile and use it to generate his document. This enables the designer to verify that the content of the print job will fit with the final printing production process.

Usually, the PSP has generated a plurality of profiles for use by designers corresponding to types of printing projects such as brochures, books, folded pages, etc.; such profiles are generated in advance of selection by a designer. The profiles are preferably stored in electronic form in a server computer at the PSP. Alternatively, a document profile is created on the fly based on the specific requirements of the designer and the particular capabilities of the printing and production devices at the selected PSP location.

Even a moderately complex print job may comprise different components, such as a book cover and its interior pages. The corresponding document profile addresses all of the necessary components of the print job.

When the content has been prepared by the designer, he can use the parameters of the selected profile to determine whether the job will be produced as expected at the PSP. If the document needs to be sent to a different PSP, a new profile can be selected against which the document is compared. Preparing the document for press (pre-press) is greatly simplified through the use of profiles since all of the important parameters for successful printing on the selected device at the PSP are necessarily met. The use of profiles also eliminates the manual process of ensuring that a document fits a print job since the designer can select a profile to use for his document and against which his document can be verified.

Also, in step 104, a program known as a "driver" is run at the designer computer. This driver program has information about the presses and production equipment at various PSP locations. In the preferred embodiment, this driver can communicate with the PSP to obtain real time information regarding the desired printer or production devices. The driver program contains information such as the International Color Consortium (ICC) profile or color information profile of a particular printer and, specifically, of a specific print job created from that printer. The ICC profile is known in the commercial printing arts as a color profile for a specific type of printout that depends on the ink and the media used. The driver program also contains information regarding the media in the selected printer such as: the orientation, the type, the size, the weight and the finish.

Designer Location Automated Preflight

Next, step 106 illustrates the performance of an automated "preflight" of the designer's print job. This step is performed after there has been a job ticket created and the driver is running. The performance of the preflight ensures that the file is ready to print at the PSP and that it will result in an output substantially as intended by the designer. The preflight program helps to automate the function of converting the print job to a press ready file. This preflight program establishes a link to the PSP and obtains information regarding the desired printing presses and production devices. The preflight program then reviews the document specifications and compares them to the device characteristics at the PSP. Referring to the detailed job ticket, the preflight module knows what printer is to be used as well as what production devices, such as the finishing device, the packaging device and the shipping device, are to be used. It determines whether all of the required elements for successfully completing the printing, finishing, packaging and shipping tasks are present in the print job. It checks to ensure there are no significant errors in the print job that would require manual effort in the prepress stage at the PSP.

The preflight module 106 checks to determine whether some of the common errors normally found during the prepress stage at the PSP are present in the print job created by the designer. Such errors include: missing fonts, missing images, incorrect image resolutions, missing crop marks, incorrect scaling, incorrect rotation, and incorrect color space. Specifically, the preflight module 106 determines whether the ICC profile for the print job matches that of the selected digital press and paper type at the PSP. It determines whether the paper loaded in the press is the one required for the print job. It determines whether the inks in the digital press are the ones required in the print job. It determines whether there are imposition instructions for the job for the press selected. It further determines whether there is an imposition proofing file and whether imposition has been done and approved. It determines whether a contract proof has been approved. It determines whether a remote printing file (.rpf file) is present in order to print a contract proof at the appropriate printers at the designer or customer locations. It determines whether RIP instructions are present if required for the print job. Similarly, it determines whether trapping instructions are present if required. As would be apparent to those skilled in the art, RIP instructions are useful for the raster or dot pattern for the press to print ink on paper and trapping instructions are useful to ensure that two adjacent images are properly overlapped to avoid blurring or undesired spacing between them.

In addition to the printing and imposition requirements, the automated preflight program 106 checks whether the appropriate finishing device is attached to the printer to be used for the job. It also checks to ensure that the finishing device is ready and is functional and has the finishing capabilities required to perform the tasks desired by the designer. The preflight also checks to make sure there are finishing instructions present with the job. It further checks to determine whether there is a file to print the finishing mock up and if the mock up has been approved.

With respect to packaging, the preflight program 106 checks to ensure that appropriate packaging instructions are present and that they correspond to the appropriate packaging device. It further checks to ensure the packaging device is indeed attached to the printer and the finisher to be used for the print job and that it is fully operationally and has all of the required material to perform the job desired by the designer.

With respect to shipping the preflight program 106 checks to ensure there are indeed shipping instructions. It further checks to ensure there is a list of final designation names and addresses and that the list has no errors. It also checks to see if there is a valid automated courier selected.

The preflight module generates a report based on the items it has checked. Using this report, the designer is alerted to items which require his further attention before the job can be submitted for printing. In addition to or in place of the report, the preflight module generates alarms when errors are found. The program can request the designer or the customer submitting the job to provide any missing information, can acquire such information, can verify that it is appropriate, and can insert it into the file and make any appropriate changes to the job ticket. Some of the items can be corrected automatically.

Designer Location Automated Setup and Proofing

After the preflight step has been completed, the document is ready to be "proofed" or previewed by the designer or the customer. In order to produce a proof copy, the driver program, in step 108, generates a remote proof file (.rpf). This file is printed at a specialized high-resolution proof printer at the designer location or at the customer location. The proof is reviewed by the designer or the customer depending upon who has final approval authority. The proof itself substantially and accurately reflects what the final output would be if the file were to be printed at the PSP using the selected production parameters and devices. Once approval is received, the job ticket is updated. Note that steps 108, 110, 112, 114 and 116 are only performed if necessary as determined during preflight.

It step 110, imposition on the selected PSP printer is set up remotely from the designer location. Imposition is a term used in commercial printing to represent the efficient utilization of space and materials at the printing press. It involves the moving and reordering of items to be printed in order to minimize the wasteage of material and maximize the efficiency of printing. It also involves the pagination and other treatment of items to be printed in order to conform to the type of product to be made such as brochures, booklets, etc.

Since the designer's computer has information regarding the automated printer at the PSP location, it is possible to perform all or some of the imposition tasks at the designer stage. After imposition instructions are created the imposition set up can be proofed using a printer as discussed above with respect to step 108 but also can be proofed on-screen by the designer or customer. The job ticket is also updated with the imposition information.

Step 112 illustrates that basic finishing instructions are set from the designer location. Finishing is a term used in commercial printing to refer to the treatment of the printed pages such as folding, trimming, cutting, laminating or UV coding. Since finishing equipment to be used at the PSP is known, finishing instructions can be generated in accordance with the designer's desired print job. In addition to text instructions, the finishing instructions can include graphical representations or "mock-ups" of the finishing to be performed. The job ticket is updated with the finishing instructions.

Step 114 illustrates that the packaging instructions are set up remotely and proofed remotely from the designer location. Since the actual packaging device to be used at the PSP location is known, the instructions for packaging can be created at the designer location based on the designer's requested packaging and the job ticket. Upon creation of the packaging instructions, the job ticket is updated.

Step 116 illustrates that the shipping of the print job can be set up remotely at the designer location as well. Since the actual shipping method to be used at the PSP location including the courier to be used and protocols used to communicate with the courier are known the instructions for shipping can be generated remotely at the designer location based on the designer's desired shipping technique. Shipping instructions are generated based on the list provided by the designer and are used to update the job ticket.

Press Ready File Encapsulation and Submittal

High performance file 118 shown in FIG. 1 represents not only the digital file of the print job but also the various instructions files generated by elements 106, 108, 110, 112, 114 and 116. These and other files are encapsulated in step 120 labeled the high performance file remote submittal. Specifically, the files encapsulated include: the job ticket, the actual graphic art component of the print job, the actual fonts and links, the actual images and links, the remote proof file (.rpf) if created, the imposition instructions, the imposition proof in PDF format if such proof is available, the finishing instructions, the finishing proof for example a picture of the mock up if available, the packaging instructions, a graphical representation of the packaging instructions if available, and the shipping instructions.

Figure 3:
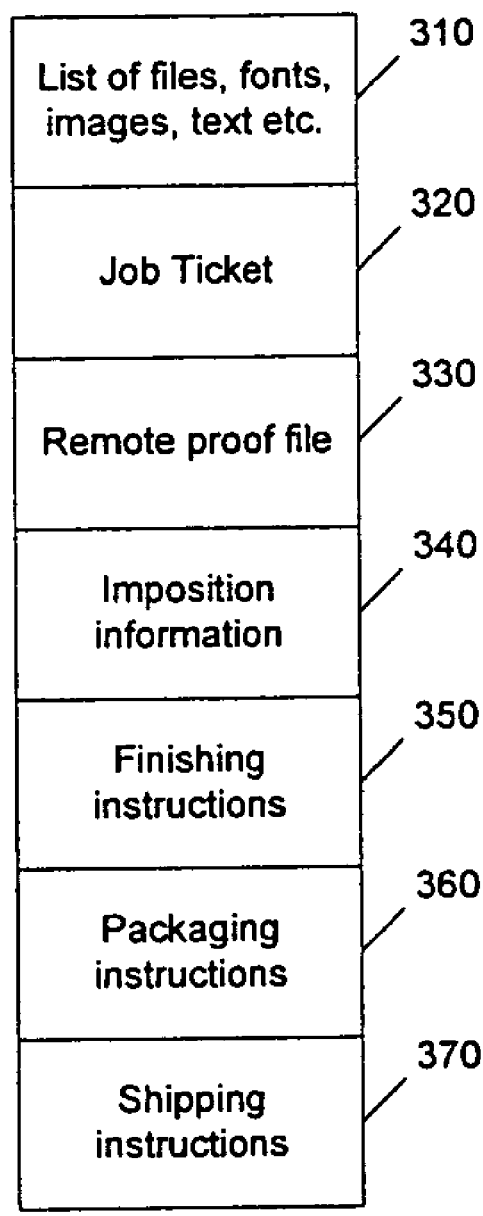
FIG. 3 illustrates the various components of an encapsulated file to be submitted to a print service provider under the present invention.

The various files being encapsulated in step 120 are illustrated in FIG. 3. In this figure, element 310 represents the files of the actual print job generated by the designer as well as the necessary images and fonts. Element 320 is the job ticket. Element 330 is the remote proof file. Element 340 represents the imposition instructions. Elements 350, 360 and 370 represent, respectively, the finishing, packaging and shipping instructions.

This encapsulated file or, in essence, the series of files is sent as a package over a network or over a direct connection to the PSP location. This network or direct connection is illustrated as element 122 in FIG. 1.

Print Service Provider Location

The PSP receives the high performance file from the designer location over the connection 122. This file is submitted to a PSP preflight module instep 124. This marks the traditional beginning of PSP prepress operations. These prepress operations, as discussed above, take much time and effort and diminish the efficiency of the PSP. Under the present invention, the prepress efforts at the PSP are minimized. While the print job has already been preflighted at the designer location, it is submitted to a PSP preflight to further ensure that the file is ready to print at the commercial printer.

Print Service Provider Location Automated Preflight

The main function of the PSP high performance preflight module in step 124 is to ensure that the various commercial printing and production devices selected to be used with the print job will function in the manner envisioned to produce the desired output. The automated preflight and other steps performed in the prepress stage at the print service provider are performed using a server computer at the print service provider. The intent is to have very little human interaction and to correct any production instructions automatically where possible.

This module is able to open, read and interpret the electronic job ticket associated with the print job. This enables it to ensure that all of the files and specifically the instruction files associated with the print job are indeed present and were completely received by the PSP. The preflight module running on a server at the PSP is connected to the various production devices at the PSP and has updated information regarding their status. The preflight module checks to see if the printing and production equipment selected by the designer is indeed available. Between the time the designer made a selection of a production device and the time the file is received at the PSP after the designer has created the substance of the print job, many things may have changed at the PSP. For example, the printing press selected by the designer to be used for the print job may be out of service for maintenance. The PSP preflight in step 124 will identify this as an issue needing to be addressed. As with the automated preflight at the designer location in step 106, the PSP preflight in step 124 can issue reports and build alarms based on the "errors" it finds in the print job.

The preflight module checks the high performance file to determine what if any errors are present that would prevent the job from being completed properly. Such errors are the same as those checked for in the preflight stage at the designer location. For example, the PSP preflight module in step 124 checks to see if any images are missing or if the file requires the use of a font which is not available at the actual printer at the PSP and cannot be substituted by an equivalent font. Such errors are electronically communicated back to the designer for correction. Some errors in the print job go to the substance of what will be printed and need human intervention for correction, either at the print service provider location or with the designer or customer. However, most of the errors found during the preflight stage at the print service provider can be automatically identified with the PSP preflight module in step 124.

If the PSP high performance preflight module in step 124 identifies any errors in printing setup, imposition setup, finishing setup, packaging setup or shipping setup, the file is subjected to steps to correct such errors and provide any missing instructions for these tasks. Also, if the printer or other production device selected by the designer is not available at the PSP for whatever reason, the corresponding setup step must be performed in order to provide appropriate instructions for the specific printing or production device that will be performing the task.

Print Service Provider Location Automated Setup and Proofing

If no changes are necessary, the high performance file received from the designer location is verified to be press ready in step 124, and the verified press ready file is submitted for printing and production beginning in step 138. However, in most cases, one or more additional setup steps must be performed at the print service provider for the reasons set forth above. These steps effective "correct" the production ready file by adding missing instructions or files or by revising instructions to account for changes in equipment.

After preflight is performed, and if corrective action is necessary, in step 125, the PSP performs an automated remote printing setup. If the job can be printed at the print service provider, this module assigns a design-to-press (DTP) enabled printing device, and corrects the product ready file to be able to print on the assigned printer. It then updates the job ticket, marks the job as admitted and assigned to the printing device and forwards the job to the next PSP high performance module, if necessary. If the module, in step 125, determines that the job is not suitable for the print shop, for any of the reasons set forth above, the module sends a message or the entire file back to the original sender (customer or designer), notifies this action to the PSP server computer and to the customer/designer along with the reasons for the action. The module when necessary will request that the customer/designer provide any missing information, receive and verify it, and insert it into the file and then update the job ticket accordingly.

In step 126, the PSP performs an automated remote proofing function to allow the designer or customer to see and approve a proof, preferably a high resolution proof, of what the modified print job will look like at final output. The PSP in step 126 creates an .rpf file as discussed above and sends it to the designer or a customer for printing at the designer or customer location on a specialized printer. The proofing may have been done at the designer location, but in some cases, it may be necessary to allow for reproofing. For example, if the target printer has changed, the new printer may have different ink resulting in different shades being produced at the printed output. Also, the ICC profile for the new printer may be different. Reproofing at this step allows for the designer or customer to approve the accuracy of the colors. The designer or customer indicates his approval and communicates this approval to the PSP, preferably electronically. The job ticket is also updated.

In step 128, the PSP performs a new imposition setup. This can be because the printer has changed from the time the designer prepared the high performance file. New imposition instructions are generated so that the job, when printed, will make use of the printer's resources very efficiently. The job ticket is updated with the new imposition instructions.

In step 130, the PSP performs finishing setup. This step includes reading the finishing instructions from the designer and preparing appropriate corresponding instructions for the actual finishing device to be used at the PSP. The job ticket is updated appropriately.

In step 132, packaging setup is performed to ensure proper packaging at the device to be used at the PSP. The packaging instructions determined at the designer location are modified for use at the PSP. The job ticket is updated.

In step 134, the shipping instructions and setup are updated for the actual shipping device or method to be used at the PSP. The job ticket is updated as well. Steps 125, 126, 128, 130, 132 and 134 need not all be performed and only individual steps need to be performed where necessary in order to update or provide instructions for the particular production tasks. Often, these steps are not necessary to be taken since much of the set up has already been performed at the designer location. As mentioned above, the preflight module 124 determines which of these steps need to be performed.

The corrected press ready file along with the updated instructions is received at a PSP high performance prepress rework module in step 136. This module performs the rework of the print job to ensure that it is ready to go to production on equipment that is different than the equipment the designer originally intended.

Step 124 and one or more of steps 125, 126, 128, 130, 132 and 134 are performed on jobs in order to get them ready for production. In real production environments, there will be situations where the jobs go through the necessary steps from 124 through 134 and then they are placed in a queue (not shown) waiting for a printer so that it can enter into production. Often there are previously submitted jobs that will take a few hours to print and, therefore, the jobs will be waiting in the queue for some time. In the meantime, while the jobs are waiting to enter to actual production, there is a chance for the job to be reassigned to another press or a press to become unavailable due to maintenance. Once the job has exited the production queue, module 136 performs the last check for the job to fit the actual DTP, DTF, DTPack and DTS production system. If the job's target printer or other production is changed, the PSP high performance prepress rework module schedules to run, or re-run the appropriate prepress applications before the job is actually submitted to production.

Output Press

When the high performance file containing the print job is ready to be sent to production either directly from step 124 or through step 136, it is submitted to the high performance press in step 138. In the preferred embodiment, this is a digital printer that is enabled for design to press workflows. Design to Press (DTPress) is a term used to indicate that the process is fully integrated from the designer through the print service provider to the press. This press in step 138 prints the print job. Examples of such DTPress enabled digital printers are Hewlett Packard Indigo press 1000, 3000, w3200, s2000, ws2000 and ws4000.

An optional feature of a design to press enabled device is the automated checking of printing quality and integrity. In one embodiment of this option, a camera is used to provide a visual verification of print quality and accuracy. The camera can be trained to a predetermined location on the print job and can determined based on what image it receives from that location whether the output is erroneous or not. In another embodiment, an optical scanning device can scan text from the printed output and compare it to the desired text in the original file to ensure accuracy and quality of the printed output.

Output to Finishing Device

Next, if finishing is to be performed, in step 140, the printed output of the digital printer is finished in accordance with the finishing instructions. In the preferred embodiment, this is performed by a design to finish (DTFinish) enabled finishing device. This type of finishing device is often integrated with a digital printer with inline finishing capability. Design to Finish (DTFinish) is a term used to indicate that the process is fully integrated from the designer through the print service provider and the press to the finishing device. The electronic job ticket and finishing instructions provide the appropriate information to the finishing device for treatment of the printed output. Examples of such DTFinish enabled finishing devices are the Horizon APC-M61 hydraulic cutter finisher, the Standard DF-9 booklet making system finisher, the Standard SPF-20XII In-Line booklet making finisher and the Standard BQ-340S Perfect Binder finisher.

Not all finishing devices can perform all modes of finishing; often a PSP can provide finishing options in a select number of areas. In the preferred embodiment, the DTFinish enabled finishing device is modular in that certain types of finishing such as folding, cutting, UV coating, laminating, etc., are contained in modules which can be removable and replaced. What types of finishing the device can perform is dependent on what modules it has available to it and which are presently installed. If the correct module for the designer's desired finishing is not available, this will be known to the designer during the designer preflight. If it becomes unavailable at some subsequent time before production, this will become known at the PSP preflight.

Output to Packaging Device

After the printed output has been finished in step 140, it is submitted to the automated packaging device in step 142. In the preferred embodiment, this device is Design to Pack (DTPack) enabled. This term refers to the integration of packaging with the rest of the design and production processes from the designer to the PSP through the packaging device. Examples of such DTPack enabled packaging devices are the Duplo MD430/410 Docuinserter document inserter, the Duplo V-740/V-760 Forms Burster and the Autobag PI404I packaging system.

Output to Shipping Device

After the print job has been printed, finished and packaged, it is ready for shipping by the automated shipping device in step 144. In the preferred embodiment, this shipping is performed by a design to ship (DTShip) enabled device. Design to Ship refers to the integration of the design printing and production processes through shipping. An example of a DTShip enabled shipping device is the AMI Automated Shipping Module. Such a device is electronically connected to one or more third party couriers.

Job Closing

Also performed at the print service provider is automated job closing (not shown in FIG. 1). This allows for, after the job has been completed, the automated generation of an accurate bill to provide to the designer or customer for the services rendered. It also facilitates reprints or archives of the print job as discussed above.

Automated Tracking

Another aspect of the present invention is the automated tracking of print jobs through the integrated environment from the designer to the print service provider through the production steps to the final output. When dealing with the physical media as it travels through the PSP, one method of tracking uses bar codes and scanners in order to accurately and efficiently update the location and status of the job as it moves through the process. These barcodes are also useful in order to differentiate multiple jobs at the print service provider. The barcode is associated with the job ticket electronically and upon scanning can retrieve all of the required information regarding the print job.

Automated Status Monitor

Another feature of the present invention is that throughout the printing and production process, the status of the print job is continuously updated and monitored by a status bar that is available for viewing by the designer, the customer and the PSP. This status bar is automatically updated indicates at what stage the print job is presently as well as other information regarding what steps have been performed and at what times. Once the designer is linked into the print service provider location for submitting a job, the status bar is created. This status bar is visible to the PSP. The PSP can determine whether the make it visible to the designer and customer or not and what level of detail to provide to the designer and customer.

As noted above, embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

The invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented method of generating a production ready document in a commercial printing environment including a designer location and a print service provider location, said method comprising:

creating a digital file at the designer location using updated device configuration information operating on a computer system from the print service provider location;

selecting a document profile for said file from a plurality of document profiles available on the computer system at the print service provider location;

applying said selected document profile to said file and automatically adjusting characteristics of said file at the designer location, if necessary, to ensure that said file is a production ready document;

automatically checking for common errors associated during a prepress stage by automatically pre-flighting the document to be printed;

automatically revising incorrect printing instructions and adding missing printing instructions;

automatically providing a remote computerized proofing function for a customer of the document to be printed and automatically electronically tracking the printing of the document by continuously monitoring and updating a status of the document to be printed;

electronically submitting said production ready document to the print service provider location via an electronic network; and performing automated printing and at least one of automated finishing, automated packaging and automated shipping using said production ready document.

2. A method of generating a production ready document according to claim 1, wherein after said step of submitting, said method further comprises a step of verifying, at said print service provider location, that said production ready document will be produced at said print service provider location as designed at the designer location and, if not, correcting said production ready document to ensure production substantially as designed.

3. A method of generating a production ready document according to claim 2, wherein said step of creating a file at the designer location using updated device configuration information from the print service provider location further comprises selecting an available production device based on said updated device configuration information.

4. A method of generating a production ready document according to claim 2 wherein said selected document profile corresponds to a particular type of production project and comprises operational parameters for a target production device corresponding that the particular type of project.

5. A method of generating a production ready document according to claim 4 wherein said parameters comprise at least one of color profile, number of pages and sizes of pages.

6. A method of generating a production ready document according to claim 2 wherein said selected document profile is generated and stored at the print service provider location and selected at the designer location over said electronic network.

7. A computer-implemented method of generating a production ready document in a commercial printing environment including a designer location and a print service provider location, said method comprising:

electronically selecting a document profile corresponding to a particular type of production project from a plurality of document profiles available on a first computer system at the print service provider location;

creating a digital file on a second computer system at the designer location using said selected document profile and updated device configuration information from the print service provider location to ensure that said file is a production ready document;

automatically checking for common errors associated during a prepress stage by automatically pre-flighting the document to be printed;

automatically revising incorrect printing instructions and adding missing printing instructions;

automatically providing a remote computerized proofing function for a customer of the document to be printed and automatically tracking the printing of the document by continuously monitoring and updating a status of the document to be printed;

electronically submitting said production ready document to the print service provider location via an electronic network; and performing automated printing and at least one of automated finishing, automated packaging and automated shipping using said production ready document.

8. A method of generating a production ready document according to claim 7, wherein after said step of submitting, said method further comprises a step of verifying, at said print service provider location, that said production ready document will be produced at said print service provider location as designed at the designer location and, if not, correcting said production ready document to ensure production substantially as designed.

9. A method of generating a production ready document according to claim 8, wherein said step of creating a file at the designer location using updated device configuration information from the print service provider location further comprises selecting an available production device based on said updated device configuration information.

10. A method of generating a production ready document according to claim 8 wherein said selected document profile corresponding to a particular type of production project comprises operational parameters for a target production device corresponding that the particular type of project.

11. A method of generating a production ready document according to claim 10 wherein said parameters comprise at least one of color profile, number of pages and sizes of pages.

12. A method of generating a production ready document according to claim 8 wherein said selected document profile is generated and stored at the print service provider location and selected at the designer location over said electronic network.

13. A computer readable medium configured to execute instructions for generating a production ready document in a commercial printing environment including a designer location and a print service provider location, when executed, the instructions causing the following steps to occur, comprising:

creating a file at the designer location using updated device configuration information from the print service provider location;

selecting a document profile for said file from a plurality of document profiles available at the print service provider location;

applying said selected document profile to said file and automatically adjusting characteristics of said file at the designer location, if necessary, to ensure that said file is a production ready document;

automatically checking for common errors associated during a prepress stage by automatically pre-flighting the document to be printed;

automatically revising incorrect printing instructions and adding missing printing instructions;

automatically providing a remote proofing function for a customer of the document to be printed and automatically tracking the printing of the document by continuously monitoring and updating a status of the document to be printed;

submitting said production ready document to the print service provider location via an electronic network; and performing automated printing and at least one of automated finishing, automated packaging and automated shipping using said production ready document.

14. A program product according to claim 13, wherein after said step of submitting, said method further comprises a step of verifying, at said print service provider location, that said production ready document will be produced at said print service provider location as designed at the designer location and, if not, correcting said production ready document to ensure production substantially as designed.

15. A program product according to claim 14 wherein said step of creating a file at the designer location using updated device configuration information from the print service provider location further comprises selecting an available production device based on said updated device configuration information.

16. A program product according to claim 14 wherein said selected document profile corresponding to a particular type of production project comprises operational parameters for a target production device corresponding that the particular type of project.

17. A program product according to claim 16 wherein said parameters comprise at least one of color profile, number of pages and sizes of pages.

18. A program product according to claim 14 wherein said selected document profile is generated and stored at the print service provider location and selected at the designer location over said electronic network.

19. A computer readable medium storing instructions for generating a production ready document in a commercial printing environment including a designer location and a print service provider location, when executed, the instructions causing the following steps to occur, comprising:

selecting a document profile corresponding to a particular type of production project from a plurality of document profiles available at the print service provider location;

creating a file at the designer location using said selected document profile and updated device configuration information from the print service provider location to ensure that said file is a production ready document;

automatically checking for common errors associated during a prepress stage by automatically pre-flighting the document to be printed;

automatically revising incorrect printing instructions and adding missing printing instructions;

automatically providing a remote proofing function for a customer of the document to be printed and automatically tracking the printing of the document by continuously monitoring and updating a status of the document to be printed;

submitting said production ready document to the print service provider location via an electronic network; and performing automated printing and at least one of automated finishing, automated packaging and automated shipping using said production ready document.

20. A program product according to claim 19 wherein after said step of submitting, said method further comprises a step of verifying, at said print service provider location, that said production ready document will be produced at said print service provider location as designed at the designer location and, if not, correcting said production ready document to ensure production substantially as designed.

21. A program product according to claim 20 wherein said step of creating a file at the designer location using updated device configuration information from the print service provider location further comprises selecting an available production device based on said updated device configuration information.

22. A program product according to claim 20 wherein said selected document profile corresponding to a particular type of production project comprises operational parameters for a target production device corresponding that the particular type of project.

23. A program product according to claim 22 wherein said parameters comprise at least one of color profile, number of pages and sizes of pages.

24. A program product according to claim 20 wherein said selected document profile is generated and stored at the print service provider location and selected at the designer location over said electronic network.

25. A system for generating a production ready document in a commercial printing environment including a designer location and a print service provider location, said system comprising:
   means for creating a file at the designer location using updated device configuration information from the print service provider location;
   means for selecting a document profile for said file from a plurality of document profiles available at the print service provider location;
   means for applying said selected document profile to said file and automatically adjusting characteristics of said file at the designer location, if necessary, to ensure that said file is a production ready document;
   means for automatically checking for common errors associated during a prepress stage by automatically preflighting the document to be printed;
   means for automatically revising incorrect printing instructions and adding missing printing instructions;
   means for automatically providing a remote proofing function for a customer of the document to be printed and automatically tracking the printing of the document by continuously monitoring and updating a status of the document to be printed;
   means for submitting said production ready document to the print service provider location via an electronic network; and
   means for performing automated printing and at least one of automated finishing, automated packaging and automated shipping using said production ready document.

26. A system for generating a production ready document in a commercial printing environment including a designer location and a print service provider location, said system comprising:
   means for selecting a document profile corresponding to a particular type of production project from a plurality of document profiles available at the print service provider location;
   means for creating a file at the designer location using said selected document profile and updated device configuration information from the print service provider location to ensure that said file is a production ready document;
   means for automatically checking for common errors associated during a prepress stage by automatically preflighting the document to be printed;
   means for automatically revising incorrect printing instructions and adding missing printing instructions;
   means for automatically providing a remote proofing function for a customer of the document to be printed and automatically tracking the printing of the document by continuously monitoring and updating a status of the document to be printed;
   means for submitting said production ready document to the print service provider location via an electronic network; and
   means for performing automated printing and at least one of automated finishing, automated packaging and automated shipping using said production ready document.

* * * * *

UNITED STATES PATENT AND TRADEMARK OFFICE
CERTIFICATE OF CORRECTION

| | |
|---|---|
| PATENT NO. | : 7,570,379 B2 |
| APPLICATION NO. | : 10/635536 |
| DATED | : August 4, 2009 |
| INVENTOR(S) | : Alejandro Wiechers et al. |

Page 1 of 1

It is certified that error appears in the above-identified patent and that said Letters Patent is hereby corrected as shown below:

In column 10, line 61, delete "Output Press" and insert -- Output To Press --, therefor.

Signed and Sealed this

Twenty-second Day of December, 2009

David J. Kappos
*Director of the United States Patent and Trademark Office*